July 21, 1964  J. H. ANDRESEN, JR  3,141,399
CABIN PRESSURE REGULATING SYSTEM
Filed Nov. 16, 1959  2 Sheets-Sheet 1
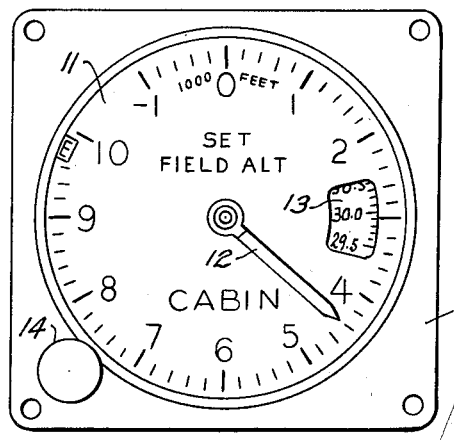
_FIG. 1_
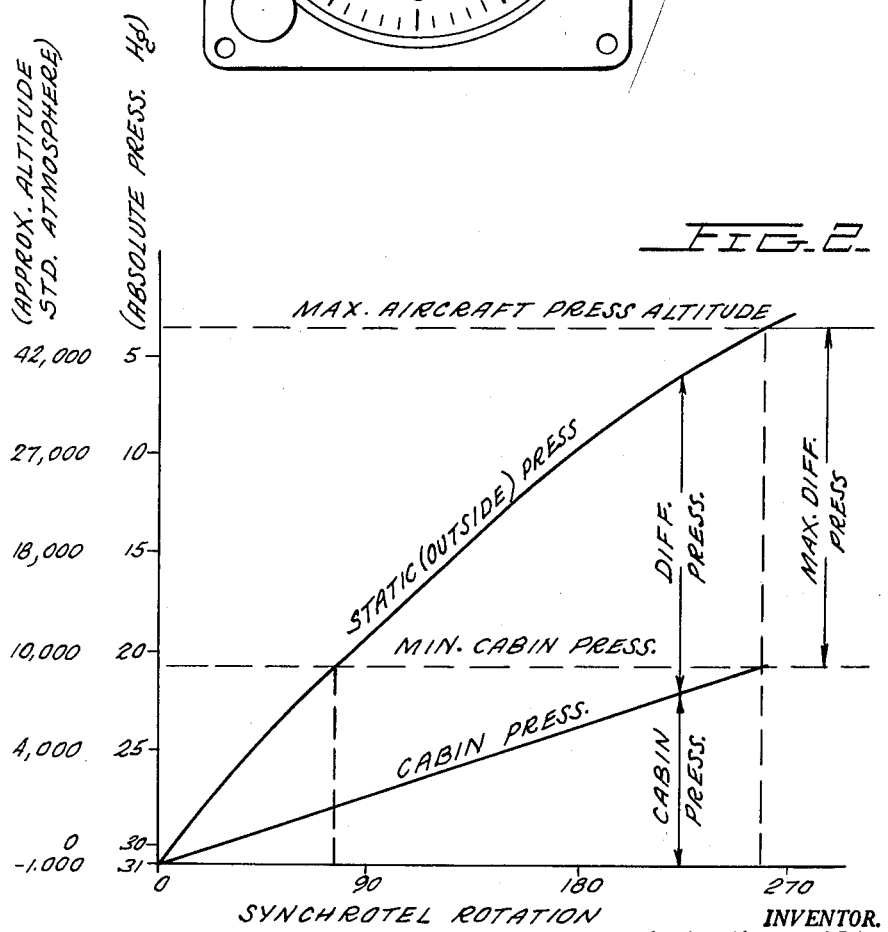
_FIG. 2_
INVENTOR.
JOHN H. ANDRESEN, JR.
BY Ostrolenk, Faber,
Gerb & Soffen
ATTORNEYS

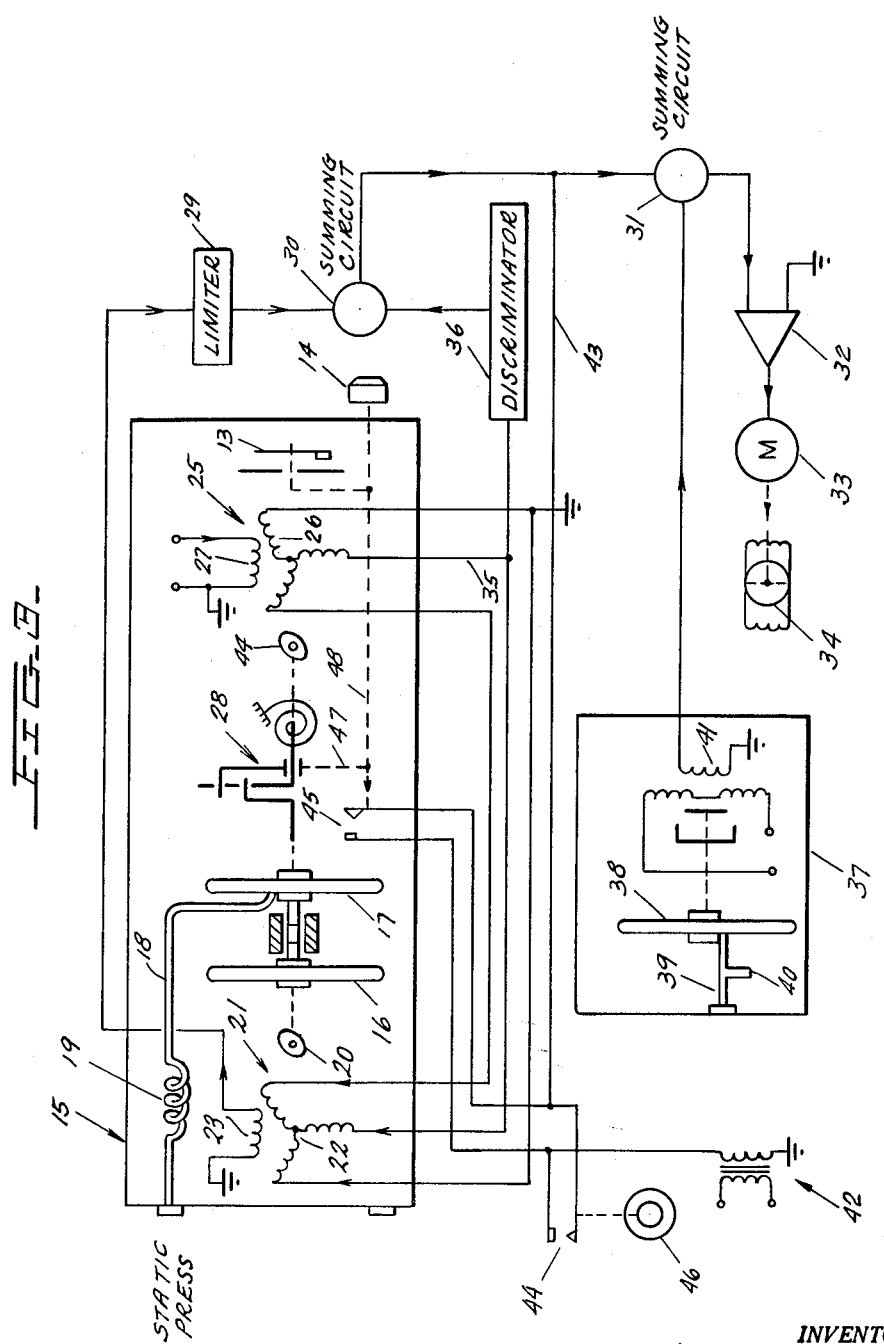

United States Patent Office 3,141,399
Patented July 21, 1964

3,141,399
CABIN PRESSURE REGULATING SYSTEM
John H. Andresen, Jr., Greenwood Lake, N.Y., assignor to Kollsman Instrument Corporation, Elmhurst, N.Y., a corporation of New York
Filed Nov. 16, 1959, Ser. No. 853,261
1 Claim. (Cl. 98—1.5)

This invention relates to a cabin pressure regulating system wherein there is a predetermined schedule between ambient absolute pressure outside the aircraft and the absolute pressure to be controlled within the aircraft cabin to provide a maximum of passenger comfort and a minimum of pilot attention to the cabin pressure control.

Basically, the invention provides a cabin pressure controller which has a first synchro means positioned in accordance with the outside static pressure, and a second synchro means which has an output dependent upon the pressure differential between the outside pressure and the cabin pressure. Each of these two synchro devices generates a predetermined voltage signal for predetermined outside pressure and cabin pressure respectively whereby, when the cabin pressure varies from this schedule, an error signal is generated and amplified to control the position of an exhaust valve in the cabin or the super-charger bringing air into the cabin. Accordingly, the predetermined schedule which is set for maximum passenger comfort is maintained.

Several safety overrides are additionally provided which will override the normal scheduled operation. The first of these is a rate of change of cabin pressure monitor which limits the rate of change of cabin pressure to some predetermined maximum value where the cabin pressure change could not exceed, for example, 300 feet per minute under rapid climbing and diving conditions.

A second override is a differential pressure override which will prevent the build-up of excessive and dangerous differential pressures between the external atmospheric pressure and the internal cabin pressure which could cause damage to the air frame. The differential pressure override merely measures this differential pressure and can be the same element used to measure the scheduled cabin pressure, and delivers an overriding signal which overrides all of the signals including the rate control signal to control the exhaust valve in such a manner that a dangerous differential is never exceeded.

Further overriding signals are provided either manually under control of the pilot when he wishes to equalize pressure for any reason, or under the influence of the landing gear such that when a landing gear is lowered the control valve is automatically opened to begin to equalize cabin pressure to external pressure only under the influence of the cabin rate monitor to prevent equalization at an uncomfortably rapid rate of change of pressure.

Accordingly, the primary object of this invention is to provide a novel cabin pressure regulating system which provides a maximum in passenger comfort and requires a minimum of pilot attention.

Another object of this invention is to provide a novel cabin pressure regulating system in which the cabin pressure is varied according to a predetermined schedule with respect to external pressure.

Another object of this invention is to provide a novel servo means for delivering an output error signal to a pressure control means which is dependent upon the variation of cabin pressure from some predetermined schedule with respect to the external pressure altitude.

A further object of this invention is to provide a novel cabin pressure regulating system wherein there is a predetermined schedule of cabin pressure with respect to static pressure and the rate of change of pressure is held below a predetermined maximum value regardless of variations from the schedule, and a maximum predetermined differential pressure cannot be exceeded under any circumstance.

These and other objects of my invention will become apparent from the following description when taken in connection with the drawings, in which:

FIGURE 1 illustrates the cabin pressure controller instrument dial face.

FIGURE 2 illustrates a particular schedule of static pressure and cabin pressure which is to be followed in accordance with the invention.

FIGURE 3 is a functional schematic diagram of a cabin pressure regulating system which will operate in accordance with the predetermined schedule of FIGURE 2.

The principle of the present invention is that for each value of ambient absolute pressure outside the aircraft there is a scheduled absolute pressure to be controlled within the aircraft cabin. For simplicity of instrumentation and better accuracy, it will be seen hereinafter that the differential pressure between the inside and outside of the aircraft cabin is measured rather than the outside pressure itself. However, values of cabin pressure are scheduled against this measured differential pressure so that the concept of scheduling cabin pressure against outside pressure remains.

The relationship maintained between the outside pressure and cabin pressure in accordance with the present invention is shown in the graph of FIGURE 2 where the vertical axis shows outside pressure in terms of altitude at standard atmospheric pressure, and in terms of absolute pressure in inches of mercury. The horizontal axis gives a required output signal to assure that the proper conditions are maintained, and will be seen hereinafter to be readable in terms of rotation of a synchro rotor of synchro devices to be described hereinafter.

The upper curve of FIGURE 2 illustrates static outside pressure at different altitudes as being a function of different angular rotations of a synchro device. The lower curve illustrates cabin pressure as a function of the rotation of the rotor of another synchro device.

Clearly, at any particular outside pressure there is a particular cabin pressure which must be maintained where these pressures are determined by passing a vertical line from the static pressure curve to the cabin pressure curve. In the event that the aircraft always takes off and lands on an airport having minus 1,000 feet pressure altitude, and if it changes altitude slowly, there will always be a fixed relation between the inside and outside pressures, as shown on the curves of FIGURE 2. In selecting the cabin pressure curve under these conditions, the curve is chosen to give the lowest maximum rate of cabin pressure change while the aircraft climbs or descends on its most probable flight program.

In the event that the aircraft climbs or dives at a very high rate, there will, of course, be a correspondingly, and possibly uncomfortable, rate of change of cabin pressure. To avoid this, it will be seen hereinafter that a cabin rate monitor is used to continuously measure rate of change of cabin pressure and to limit it to some comfortable value, such as 300 feet per minute, regardless of the schedule of FIGURE 2, subject to a still further overriding control which responds to an unsafe cabin differential pressure. When such an unsafe cabin differential pressure is approached, it will also be seen that the system automatically and smoothly increases the rate limitation just enough to avoid the maximum differential pressure from being exceeded.

It will also be seen that the pilot can manually control the point at which the automatic pressure regulation will take effect. By way of example, if an airport is at 3,000 feet above sea level, it would be undesirable to have the cabin altitude first descend toward the scheduled value for an external pressure of 3,000 feet and then climb as the flight altitude increases to a point at which the cabin pressure exceeds 3,000 feet. For this purpose, a manual setting means is provided which will prevent the cabin pressure altitude from ever going below a set pressure altitude. Hence, when taking off from a 3,000 foot altitude, the pressure controller is set at this 3,000 foot value, and the cabin pressure will not be able to decrease below this value. At any time during the flight, the pilot can reset the pressure regulating system for the pressure existing at the airport which is the destination of the aircraft, whereby the system can follow the schedule during descent until the cabin pressure equals the outside field pressure and be held there until the landing is complete.

To be certain that there are no residual differential pressures due to error in instrument setting, an error equalizing switch is also provided on the landing gear to deliver a valve open signal, or to shut off the supercharger to positively equalize the inside and outside pressure subject only to rate control. This signal can also be introduced during flight by manually operable means.

The external appearance of the cabin pressure controller is shown in FIGURE 1, and comprises an instrument housing 10 having a dial surface 11 over which a pointer 12 is moved. The pointer 12 indicates the existing cabin pressure so that malfunctions of the system can be easily noted by the pilot. The instrument also provides a dial segment 13 which is observable through a window in dial 11, and indicates the altitude pressure at the aircraft destination, and is controlled by manually adjustable knob 14.

The cabin pressure controller of FIGURE 1 is seen within the block 15 of FIGURE 3 which shows a functional schematic of the mechanism contained within the pressure controller. Generally, cabin pressure controller 15 includes a first and second separate pressure sensor 16 and 17, where pressure sensor 16 is an evacuated diaphragm capsule which is externally exposed to cabin pressure, while pressure sensor 17 is a diaphragm capsule internally exposed to static pressure over tube 18 and through damping capillary 19 which renders capsule 17 insensitive to transitory static pressure changes due, for example, to rough air.

The external surface of diaphragm capsule 17 is exposed to cabin pressure whereby the diaphragm capsule will expand and contract responsive to the pressure differential between the external static pressure and the cabin pressure.

Diaphragm capsule 16 is then operatively connected to rotatable element 20 of a synchro control transformer 21 which includes a stator winding 22 and rotor winding 23.

Diaphragm capsule 17 is connected to the rotatable element 44 of a synchro generator 25 which also includes a stator winding 26 and rotor winding 27. The connection between capsule 17 and synchro generator 25 is accomplished through a linkage 28 which rotates element 44 in accordance with the pattern illustrated for the differential pressure of the curve of FIGURE 2, while rotor 20 is rotated in accordance with the straight line cabin pressure illustrated in FIGURE 2 by means of capsule 16.

The specific construction of synchro devices 21 and 25 which are hereinafter described as "Synchrotels," which is a general term for a synchro-type device.

Generally, however, the synchro control transformer 21, or Synchrotel 21, and the synchro generator 25, or Synchrotel 25, are constructed in a standard manner well known to those skilled in the art.

The rotor winding 27 of Synchrotel 25 is excited with an A.-C. voltage which could be at 400 cycles per second. In the event that the angular positions of rotatable elements 20 and 44 of FIGURE 3 are not in accordance with the predetermined schedule of FIGURE 2, as determined in part by linkage 28, an output voltage will appear on rotor winding 23 of Synchrotel 21 which will be an A.-C. voltage having a polarity dependent upon the direction of the pressure differential and a magnitude dependent upon the excursion of the error from its predetermined value.

The error signal so generated is conducted through a limiter 29, summing circuit 30, summing circuit 31, amplifier 32 and control motor 33. The control motor 33 is schematically illustrated as controlling the position of the butterfly 34 of an exhaust valve which communicates between the aircraft cabin wall and the external atmosphere.

Accordingly, if the cabin pressure is too low, an error signal is generated into limiter 29 having a polarity indicating a low pressure and a magnitude which is related to the magnitude of the pressure error. The signal is then conducted through summing circuits 30 and 31, which have functions to be described hereinafter, to energize amplifier 32. Amplifier 32 will drive motor 33 in a first direction for an error signal of a first polarity, and in an opposite direction for an error signal of an opposite polarity. Thus, when the cabin pressure is too low, motor 33 will be driven to drive butterfly 34 in a valve-closed direction so that the cabin pressure may increase to its predetermined value at which time the error signal to the amplifier 32 disappears because of the proper alignment between rotatable elements 20 and 24 of Synchrotels 21 and 25. Accordingly, by properly dimensioning linkage 28, the predetermined schedule of FIGURE 2 is maintained.

In order to prevent the build-up of a dangerous differential pressure, a differential pressure overriding means is provided. More specifically, Synchrotel 25 is rotated at a rate such that a differential pressure of a maximum allowable value causes a rotation of somewhat less than 180° rotation. The Synchrotel 25 is electrically zeroed so that at about 0.6 inch of mercury less than the maximum differential pressure, the voltage on one pair of leads of stator 26 goes through a null and changes polarity. In FIGURE 3 this is shown as being stator lead 35 which is connected through discriminator circuit 36 to summing circuit 30.

The discriminator circuit 36 is constructed to pass only the phase of current from stator 26 after the null has been passed on increasing differential pressure. The voltage delivered from discriminator 36 to summing circuit 30 under this condition will always be a substantially larger signal than the signal entering summing circuit 30 from limiter 29. That is to say, the scheduled pressure or voltage is limited to some small finite value by limiter 29, and the output of the discriminator 36 is added to this error signal in the summing circuit 30. The differential signal, however, will override the scheduled voltage signal before a dangerous condition can arise, whereby the output to amplifier 32 will be cut off or reversed when the pressure error signal calls for a change which will lead to a dangerous differential pressure.

A second overriding signal which overrides the cabin pressure error signal is the cabin rate monitor signal which is derived from a cabin rate of change of pressure measuring means 37. Rate measuring means 37 includes a diaphragm capsule 38 which is constructed in the usual manner having its internal surfaces exposed to cabin pressure over conduit 39 and a controlled leak 40. For details of this type of construction, reference is made to my U.S. Patent 2,983,211 entitled Cabin Pressurization-Pressure Monitor System.

The output of capsule 38 which is a function of the rate of change of pressure is an A.-C. voltage appearing on winding 41 which has a phase-sensitive null at a zero rate of change of pressure.

This output phase-sensitive signal has some maximum value which corresponds to a maximum rate of change of pressure permissible, such as 300 feet per minute. This signal is delivered to summing circuit 31, and is added to the pressure error signal derived from Synchrotels 21 and 25 where the cabin rate signal is phased to always oppose the pressure error signal. Thus, the position of valve 34 will be held at a point at which the pressure error is corrected, but always below some predetermined maximum rate of pressure change. However, when the signal from summing circuit 30 includes the unlimited differential pressure signal from discriminator 36, the rate of change of cabin pressure will be proportional only to how high the differential pressure rises above its null value.

In order to equalize pressure, a fixed low impedance voltage source 42 is connectable to the input of summing circuit 31 over conductor 43 through either contact device 44 or 45. Contact device 44 is operable responsive to lowering of the landing gear 46 of the aircraft whereby the equalization voltage from source 46 swamps the other control signals and is added to the rate monitor output. Accordingly, there will be cabin pressure equalization to external pressure at a rate dependent upon the value of the fixed voltage of source 42. This operation will also proceed responsive to the closing of contacts 45 which may be operable by a manual control accessible to the pilot.

In order to set the field altitude at which the landing is to take place, an adjustable stop means is provided for the differential pressure sensor linkage 28, and, as schematically illustrated by the dotted lines 47 and 48, is movable by the external knob control 14, which has been shown in FIGURE 1. In effect, this adjustment sets a low limit on the cabin altitude corresponding to the altitude set on the dial 13, and prevents rotation of rotatable element 24 below an angular position corresponding to this field altitude.

Although this invention has been described with respect to its preferred embodiments it should be understood that many variations and modifications will now be obvious to those skilled in the art, and it is preferred, therefore, that the scope of this invention be limited not by the specific disclosure herein but only by the appended claim.

What is claimed is:

The method of regulating cabin pressure in an aircraft cabin which comprises the measurement of cabin pressure, the measurement of pressure external of said cabin, the comparison of the measured external pressure and cabin pressure, and the automatic variation of cabin pressure to force cabin pressure to follow a predetermined schedule with respect to external pressure to provide a maximum of passenger comfort for passengers within said cabin, and measuring the rate of change of cabin pressure and overriding said predetermined schedule to prevent a rate of change of cabin pressure which is greater than some predetermined value, and overriding said schedule to prevent a differential pressure greater than some predetermined value, and preventing the decrease of cabin pressure below some adjustable predetermined value.

References Cited in the file of this patent
UNITED STATES PATENTS

| | | |
|---|---|---|
| 2,450,076 | Bechberger | Sept. 28, 1948 |
| 2,549,673 | Del Mar | Apr. 17, 1951 |
| 2,585,295 | Baak | Feb. 12, 1952 |
| 2,620,719 | Price | Dec. 9, 1952 |
| 2,973,702 | Andresen | Mar. 7, 1961 |
| 2,983,211 | Andresen | May 19, 1961 |